United States Patent
Ahn (10) Patent No.: US 6,377,417 B1
(45) Date of Patent: Apr. 23, 2002

(54) METHOD FOR CONTROLLING REPEATABLE RUNOUT COMPENSATION ALGORITHM

(75) Inventor: Young-Shun Ahn, Kyongsangbuk-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/215,524

(22) Filed: Dec. 18, 1998

(30) Foreign Application Priority Data

Jan. 16, 1998 (KR) .............................................. 10-1122

(51) Int. Cl.[7] .............................................. G11B 5/596
(52) U.S. Cl. ...................................... 360/77.04; 360/53
(58) Field of Search ................................ 360/77.08, 53, 360/77.04, 31, 77.07; 714/30

(56) References Cited

U.S. PATENT DOCUMENTS

| | | | | | |
|---|---|---|---|---|---|
| 4,616,276 A | * | 10/1986 | Workman | ..................... | 360/77 |
| 4,734,606 A | * | 3/1988 | Hajec | ..................... | 310/90.5 |
| 5,283,491 A | * | 2/1994 | Jabbar et al. | .................. | 310/90 |
| 5,365,458 A | * | 11/1994 | Tamura et al. | .............. | 364/506 |
| 5,448,120 A | * | 9/1995 | Schaule et al. | ................ | 310/90 |
| 5,550,685 A | * | 8/1996 | Drouin | ..................... | 360/77.08 |
| 5,585,976 A | * | 12/1996 | Pham | ..................... | 360/77.04 |
| 6,018,432 A | * | 1/2000 | Ukani | ..................... | 360/39 X |
| 6,097,565 A | * | 8/2000 | Sri-Jayantha et al. | | 360/77.04 X |

* cited by examiner

Primary Examiner—Andrew L. Sniezek
(74) Attorney, Agent, or Firm—Robert E. Bushnell, Esq.

(57) ABSTRACT

In a method for controlling a repeatable runout (RRO) compensation algorithm in a hard disk drive, it is determined whether to enable or disable an RRO compensation algorithm in a corresponding hard disk drive in a test environment while the drive is fabricated, and in a user environment. A check routine is used to determine whether to execute the RRO compensation algorithm. A determined result is written in a disk of the drive. When a user utilizes the drive, the RRO compensation algorithm is used or not used according to the determined result.

33 Claims, 9 Drawing Sheets

METHOD FOR CONTROLLING REPEATABLE RUNOUT COMPENSATION ALGORITHM

CLAIM OF PRIORITY

This application makes reference to, incorporates the same herein, and claims all benefits accruing under 35 U.S.C. §119 from an application for METHOD FOR CONTROLLING REPEATABLE RUNOUT COMPENSATION ALGORITHM earlier filed in the Korean Industrial Property Office on the 16$^{th}$ of January 1998 and there duly assigned Serial No. 1122/1998.

BACKGROUND OF THE INVENTION

1. Technical Field

The present invention relates to a magnetic disk drive and, more particularly, to a method for controlling a repeatable runout (RRO) compensation algorithm in a hard disk drive (HDD).

2. Related Art

For the past several decades, technical improvements in the HDD of computers, together with VLSI (Very Large Scale Integrated circuit) and software techniques, have played an important role in developing the information industry. Disk drives have shown a tendency toward small size and large capacity, and the data recording density of the disk drive has increased by almost 10 times every decade.

In the HDD, data is written on a concentric track formed on any one surface of one or more magnetic recording disks. Theses disks are rotatably mounted on a spindle motor. The data is accessed by a read/write head installed on the arm of an actuator which is rotated by a voice coil motor. The voice coil motor is excited by a current to rotate the actuator and to shift the read/write head. The read/write head is accurately aligned with a storage track on the disk in order to carry out data read and write operations.

An HDD servo controller is constructed such that it may be operated in a track seek mode, a track settling mode, and a track following mode. To raise the data recording density, it is important to reduce track mis-registration (TMR), which is defined as the difference between a track center relative to the width of the track and an actual position of the head. For this reason, a high-precision servo control technique for a head arm in the track following mode has been required.

The HDD is classified as a dedicated servo type or an embedded servo type according to the method of detecting a position error signal (PES). The dedicated servo type detects the PES by using a separate disk in which only position information of the head is written. In the embedded servo type, the position information is written in every sector of the track. Since the dedicated servo type can continuously detect the position information, it has the advantage of providing for design of a controller having a bandwidth larger than that of the embedded servo type. However, an incongruity between a position information disk and a data disk, caused by degradation, results in TMR. Hence, the embedded servo type has widely been used. An existing HDD servo controller for the track following mode has a proportional-integral-differential (PID) structure in which the PES is calculated to compensate for an off-track position of the head by approximating the magnetic head to the track center so as to read and write data. If the track center of the disk coincides with the center of the spindle motor, there will be no repeated component among input following error components when the existing controller is used. Actually, the center of the disk and the center of the spindle motor do not always coincide with each other. A frequency component with a rotating frequency of the disk out of the error components as a basic mode may appear, and an exemplary characteristic curve of the PES is calculated by using a PID control algorithm. Such an incongruity between the center of the spindle motor and the center of the disk leads to an RRO phenomenon.

Recently, it has been discovered that the HDD is easily influenced by the characteristic of its parts due to the high speed and high capacity. The RRO phenomenon may be generated by external damage, such as the rotating frequency of the disk and the supply of similar signals, and a defect in the spindle motor. The RRO phenomenon has a harmful effect on the operation of the drive. Actually, an error occurs by deviation of the PES during the write and read operations of the drive.

RRO compensation algorithms for overcoming the above-mentioned problems have been proposed and applied, and such problems with the drive due to the RRO phenomenon have been improved. The RRO compensation algorithm is generally performed after the power-on ready, initial value setting, head unlatch and calibration modes are sequentially implemented. In more detail, the drive switches from the track seek mode to the track following mode after the calibration modes, and compensates for the RRO phenomenon by using a default table value and an RRO compensation equation having a value updated by the calibration mode as an input parameter. A characteristic curve of the PES is calculated after the RRO compensation algorithm.

However, an RRO compensation mode for performing the RRO compensation algorithm is always enabled when the RRO phenomenon is generated, or even when it is not generated. The RRO compensation algorithm performed upon occurrence of the RRO phenomenon compensates for the RRO phenomenon, which is a good point, but leads to a time delay, which is a bad point. The RRO compensation algorithm, as performed when the RRO phenomenon is not generated, results in a disadvantage, such as a time delay corresponding to the execution time of the RRO compensation algorithm. Furthermore, since the track settling and track following characteristics of the drive become worse, there is also a delay for a steady state response time.

The following patents are considered to be representative of the prior art, and are burdened by the disadvantages set forth herein: U.S. Pat. No. 5,585,976 to Pham., entitled Digital Sector Servo Incorporating Repeatable Run Out Tracking, U.S. Pat. No. 5,550,685 to Drouin, entitled Applying An Adaptive Feed-Forward Algorithm As A Frequency Selective Filter In A Closed Loop Disk Drive Servo System In Order To Compensate For Periodic Perturbations Which Otherwise Appear In The Servo System Position Error Signal, U.S. Pat. No. 5,448,120 to Schaule et al., entitled Integrated Hydrodynamic Bearing/Monitor Assembly, U.S. Pat. No. 5,365,458 to Tamura et al, entitled Motor Eccentricity Measuring Apparatus, U.S. Pat. No. 5,283,491 to Jabbar et al., entitled Air-Bearing Motor assembly For Magnetic Recording Systems, U.S. Pat. No. 4,734,606 to Hajec, entitled Electric Motor With Ferrofluid Bearing, U.S. Pat. No. 4,616,276 to Workman, entitled Disk File Servo Control System With Fast Reduction Of Repeatable Head Position Error, and U.S. Pat. No. 4,582,461 to Ziegelmeyer, entitled Precision Rotating Tool Mounting Device.

SUMMARY OF THE INVENTION

It is, therefore, an object of the present invention to provide a method for controlling an RRO compensation algorithm so as to stabilize a system.

It is another object of the present invention to provide a method for preventing unnecessary time delay upon application of an RRO compensation algorithm.

It is still another object of the present invention to provide a method for preventing a steady state response time delay from being generated by application of an RRO compensation algorithm.

In one aspect of the present invention, a determination is made so as to enable or disable a repeatable runout (RRO) compensation algorithm in a corresponding hard disk drive in a test environment while the drive is being fabricated, and in a user environment, by using a check routine for determining whether to execute the RRO compensation algorithm. A determined result is written on a disk of the drive. When a user utilizes the drive, the RRO compensation algorithm is used or not used according to the determined result.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
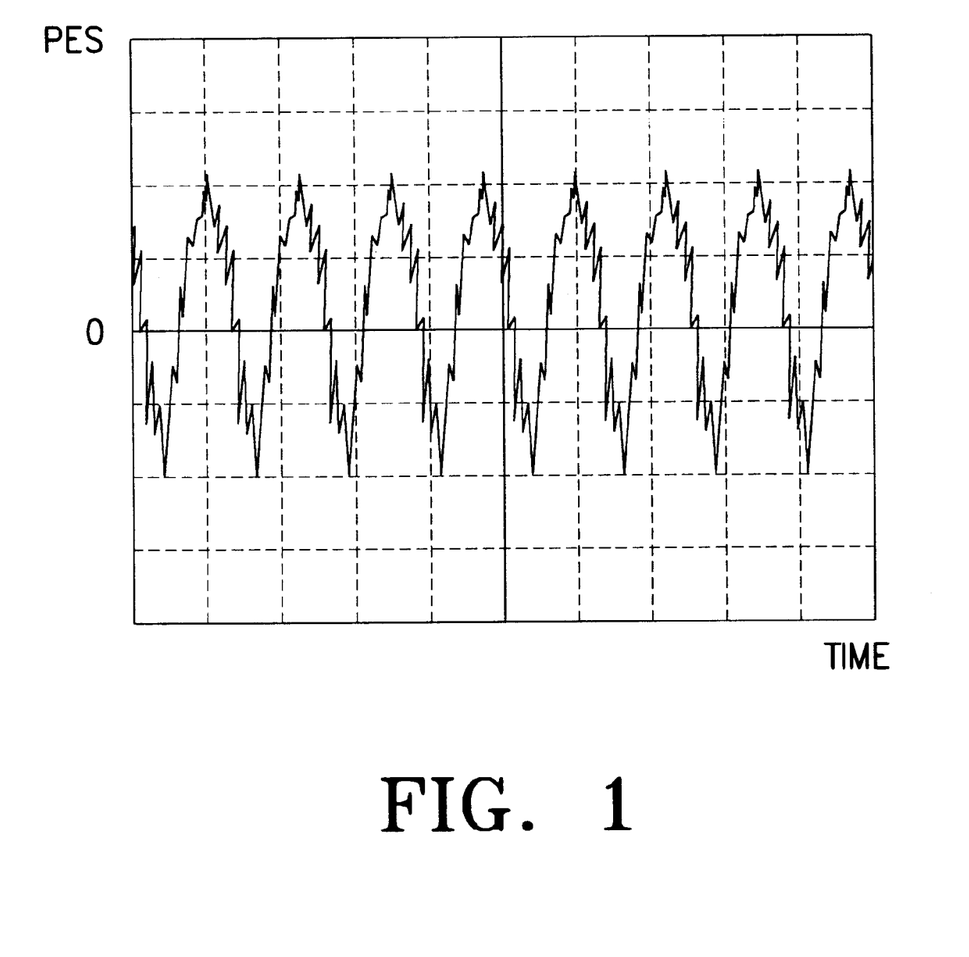
FIG. 1 shows an example of a characteristic curve of a PES calculated by using a PID control algorithm.

FIG. 1 is an example of a characteristic curve of a PES calculated by using a PID control algorithm. As mentioned above, in an embedded servo type HDD, a servo control for the track following mode as a PID structure in which the PES is calculated to compensate for an off-track position of the head by approximating the magnetic head to the track center so as to read and write data. If the track center of the disk coincides with the center of the spindle motor, there will be no repeated component among the input following the error components when the existing controller is used. Actually, the center of the disk and the center of the spindle motor do not always coincide with each other. A frequency component with a rotating frequency of the disk out of the error components as a basic mode may appear, and this is illustrated in the exemplary characteristic curve of the PES shown in FIG. 1. Such a characteristic curve is calculated by using a PID control algorithm but an incongruity between the center of the spindle motor and the center of the disk leads to the RRO phenomenon.

Figure 2:
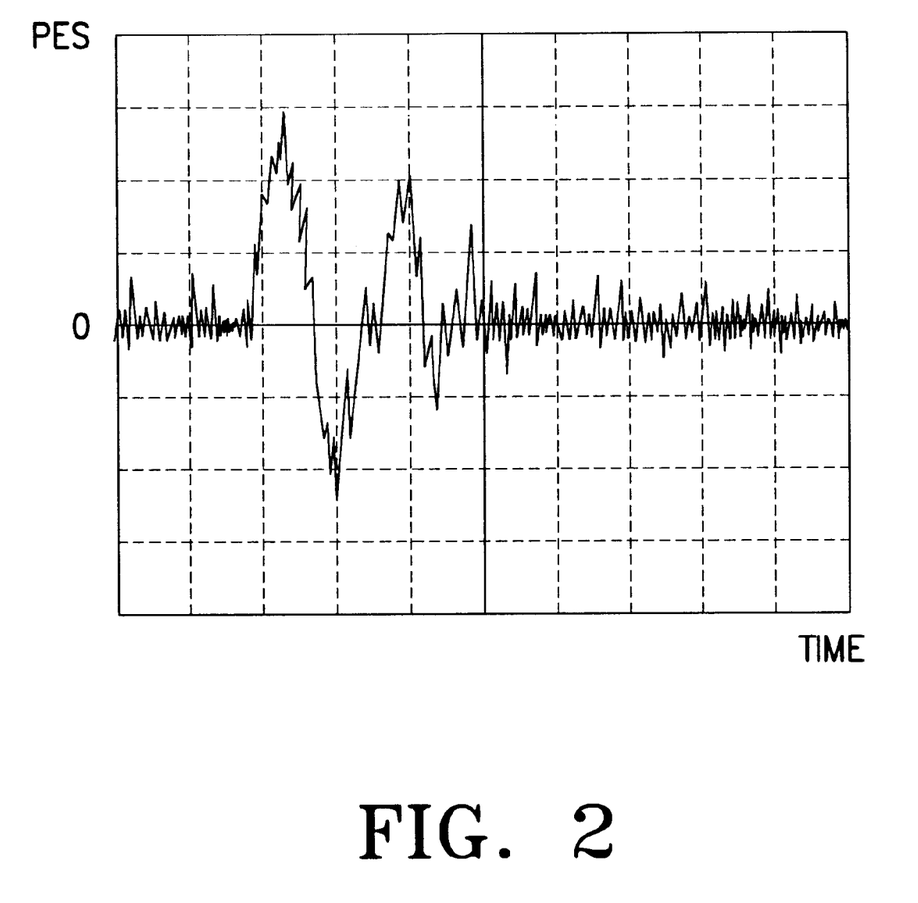
FIG. 2 shows an example of a characteristic curve of a PES calculated after an RRO compensation algorithm is performed.

FIG. 2 is an example of the characteristic curve of a PES calculated after an RRO compensation algorithm is performed. As mentioned above, it has been discovered that the HDD is easily influenced by the characteristic of its parts due to high speed and high capacity. Thus, an RRO phenomenon is generated for reasons stated in more detail above. In actuality, an error occurs due to deviation of the PES during the write and read operations of the drive. RRO compensation algorithms for overcoming these problems have been proposed and utilized. A characteristic curve of the PES is calculated after the RRO compensation algorithm is performed, and such a characteristic curve is illustrated in FIG. 2.

Figure 3:
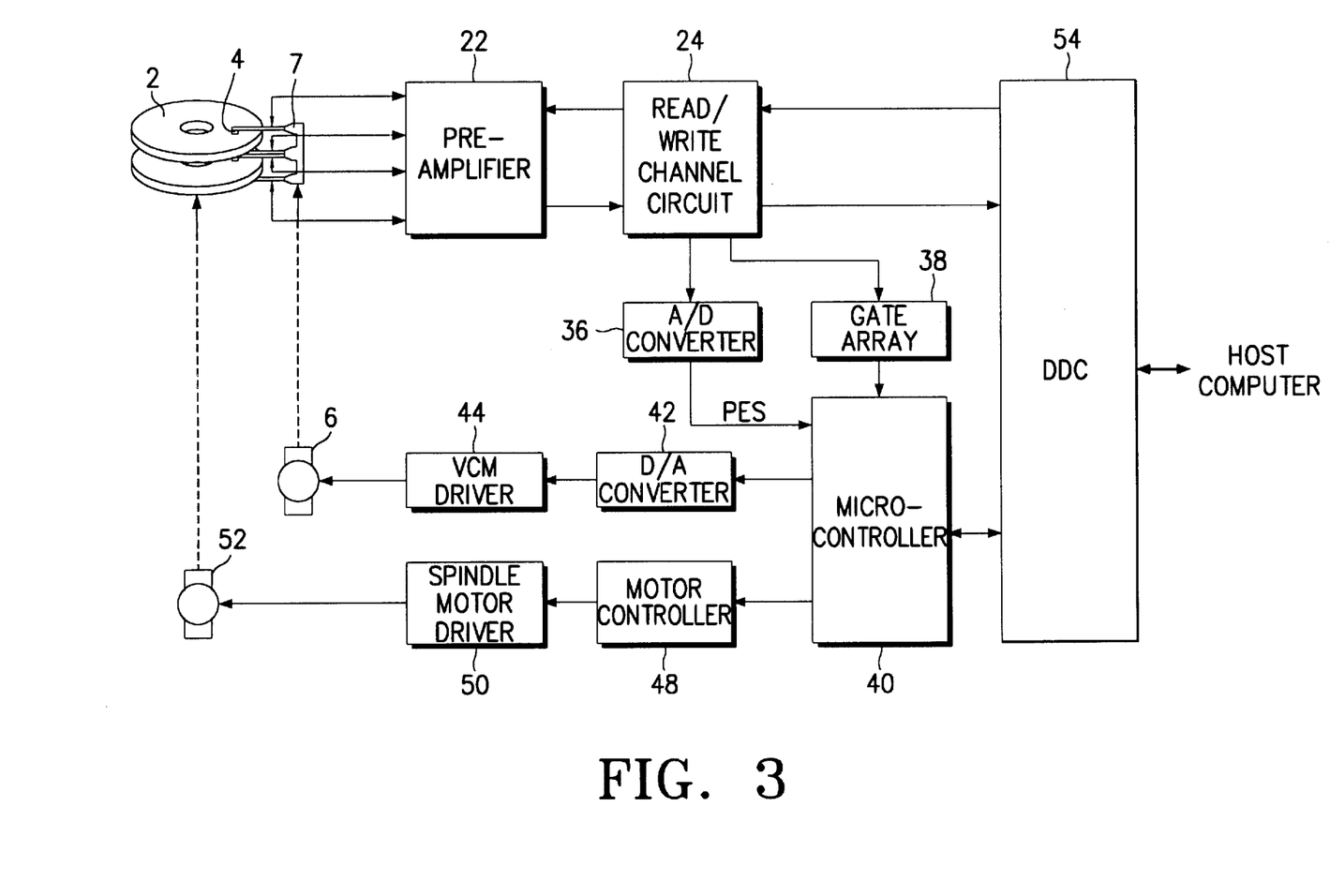
FIG. 3 is a block diagram of a hard disk drive (HDD) to which the present invention is applied.

Referring to FIG. 3, there is shown a general HDD having two disks 2. The disks 2 are rotated by a spindle motor 52. Heads 4 are positioned on the surfaces of the disks 2. The heads 4 are installed at front ends of vertically extended arms of an arm assembly 7 of an actuator 6. During a data read operation, preamplifier 22 preamplifes a signal picked up by one of the heads 2. During a data write operation, preamplifier 22 writes encoded write data applied from a read/write channel circuit 24 onto the disks 2 by driving the heads 4. The read/write channel circuit 24 detects a data pulse from a read signal applied from the preamplifier 22, and decodes the data pulse to supply a decoded data pulse to a disk data controller (DDC) 54. The read/write channel circuit 24 also encodes write data transmitted from the DDC 54 so as to supply coded data to the preamplifier 22. The DDC 54 provides a communication interface between a host computer (not shown) and a microcontroller 40, and between the host computer and the read/write channel circuit 24. The microcontroller 40 controls track seek and track following operations in response to a read or write command received from the host computer. A voice coil motor (VCM) driver 44 receives a servo control (position control of the head) value or signal from the microcontroller 40 through a digital-to-analog (D/A) converter 42, and supplies a driving current for driving the actuator 6 to a VCM of the actuator 6. The actuator 6 radially shifts the heads 4 on the disks 2 in response to the direction and level of the driving current generated by the VCM driver 44. A motor controller 48 supplies a rotation control value or signal of the disks 2 to a spindle motor driver 50 under the control of the microcontroller 40. The spindle motor driver 50 rotates the disks 2 by driving the spindle motor 52 according to the rotation control value or signal. An analog-to-digital (A/D) converter 36 converts a position error signal (PES), based on a burst signal out of servo information applied through the read/write channel circuit 24, into a digital value, and supplies the converted digital PES value to the microcontroller 40. A gate array 38 generates various timing signals necessary for the read/write operation and decodes servo information. The decoded servo information is applied to the microcontroller 40.

Figure 4:
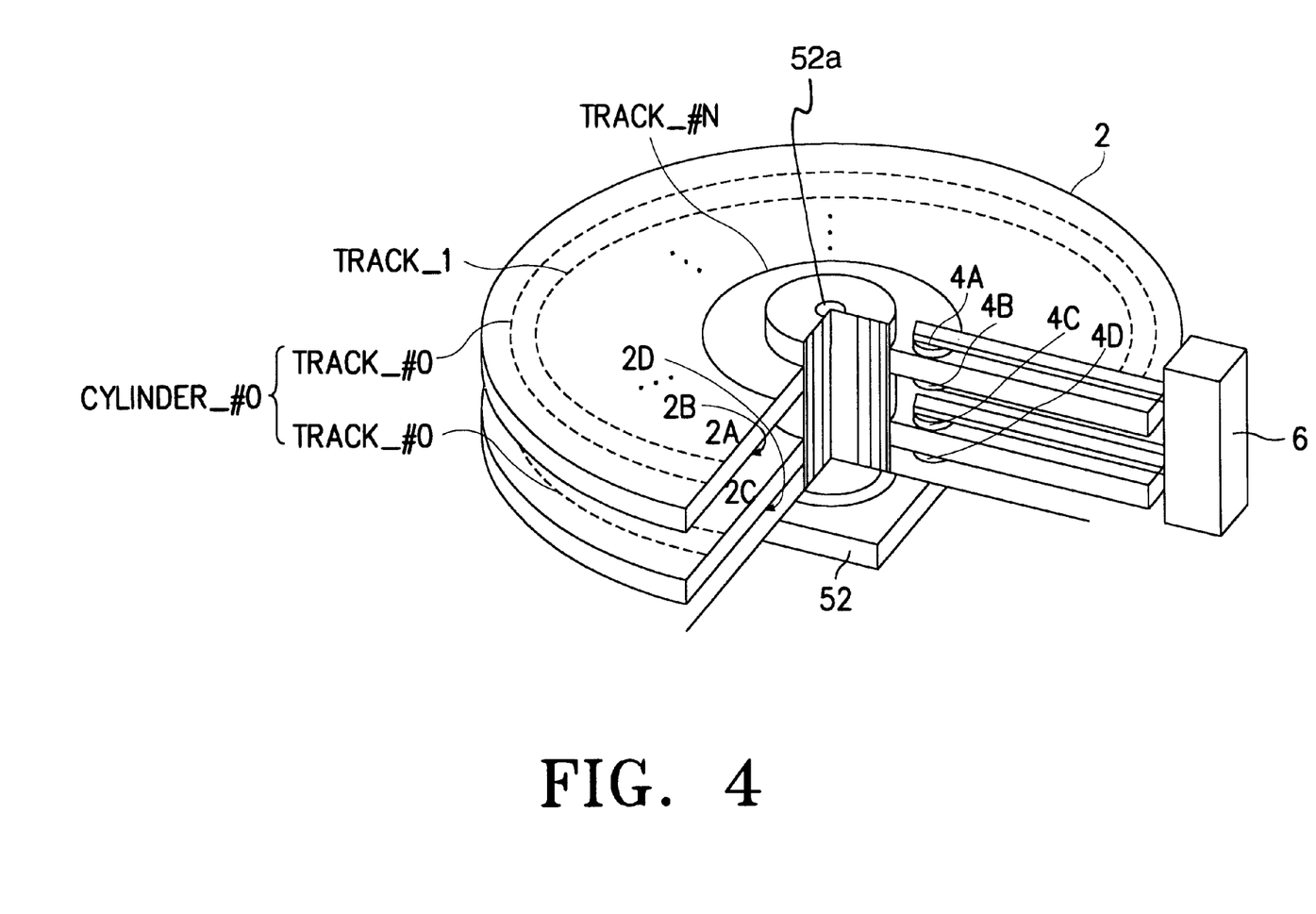
FIG. 4 is sectional view of disks which are partially broken away in an HDD using a multiplatter type.

FIG. 4 is a sectional view of the disks as partially broken away in a multi-platter type HDD. The multi-platter type HDD is used to maximize data storage capacity. In a personal computer two to six disks are mounted. Referring to FIG. 4, two disks 2 are mounted on a driving shaft 52a of the spindle motor 52. Heads 4A–4D fixed to the arm extending vertically from the actuator 6 are positioned on corresponding surfaces 2A–2D of the disks 2. On the surfaces 2A–2D of the disks 2, tracks are arranged along a concentric circle. The track have inherent track numbers, TRACK_#0 to TRACK_#N, assigned thereto. A group of the tracks with the same track number on the disk surfaces 2A–2D corresponding to the heads 4A–4D are called a cylinder. Therefore, the same track number in the respective disks is defined as the same cylinder number. For instance, all the track number of "TRACK_#0" on the disk surfaces 2A–2D corresponding to the respective heads 4A–4D have the same cylinder number of "CYLINDER_#0".

In performing an RRO compensation algorithm according to a preferred embodiment of the present invention, a determination as to whether to enable or disable the RRO compensation algorithm in the drive is made. The RRO compensation algorithm is disabled in the drive having no RRO phenomenon. The RRO compensation algorithm is enabled in the drive having an RRO phenomenon. A check to determine whether to enable or disable the RRO compensation algorithm is made during a burn-in test process during or at the end of an HDD fabricating process, and is also made in a user envornoment. The burn-in test process requires a relatively long time, typically 8–16 hours, in the HDD fabricating process. The burn-in test is perfromed based on a self-contained program (firmware) after placing the HDD on a rack within a burn-in room having high temperature and high humidity without an additional test system. The burn-in test process identifies any defect on the disk so that a defective portion is not used when the user utilizes the HDD.

In a preferred embodiment of the present invention, a check routine for determining whether to enable or disable the RRO compensation algorithm is inserted into the long time burn-in test process, which may bring about a change in environment. In more detail, the check routine for determining whether to enable or disable the RRO compensation algorithm is inserted into the initial, middle and final stages of the burn-in test process, and a determined result is written in a maintenance region of the disk. Such a check routine under the burn-in test environment will now be described with reference to FIGS. 5A to 5C.

Figure 5A:
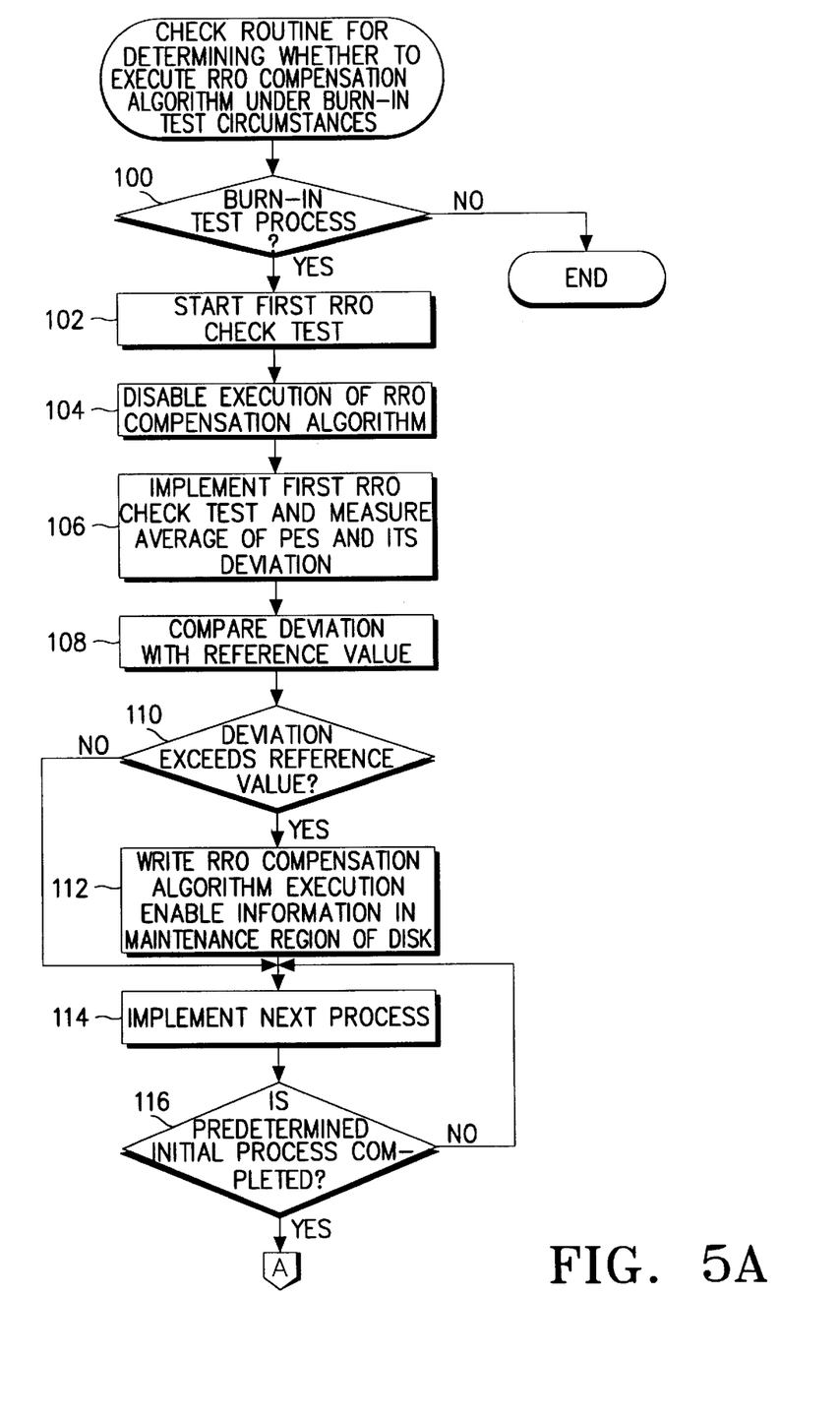
FIGS. 5A to 5C are flow charts showing a check routine of an RRO compensation algorithm under a burn-in test environment according to the present invention.
Figure 5B:
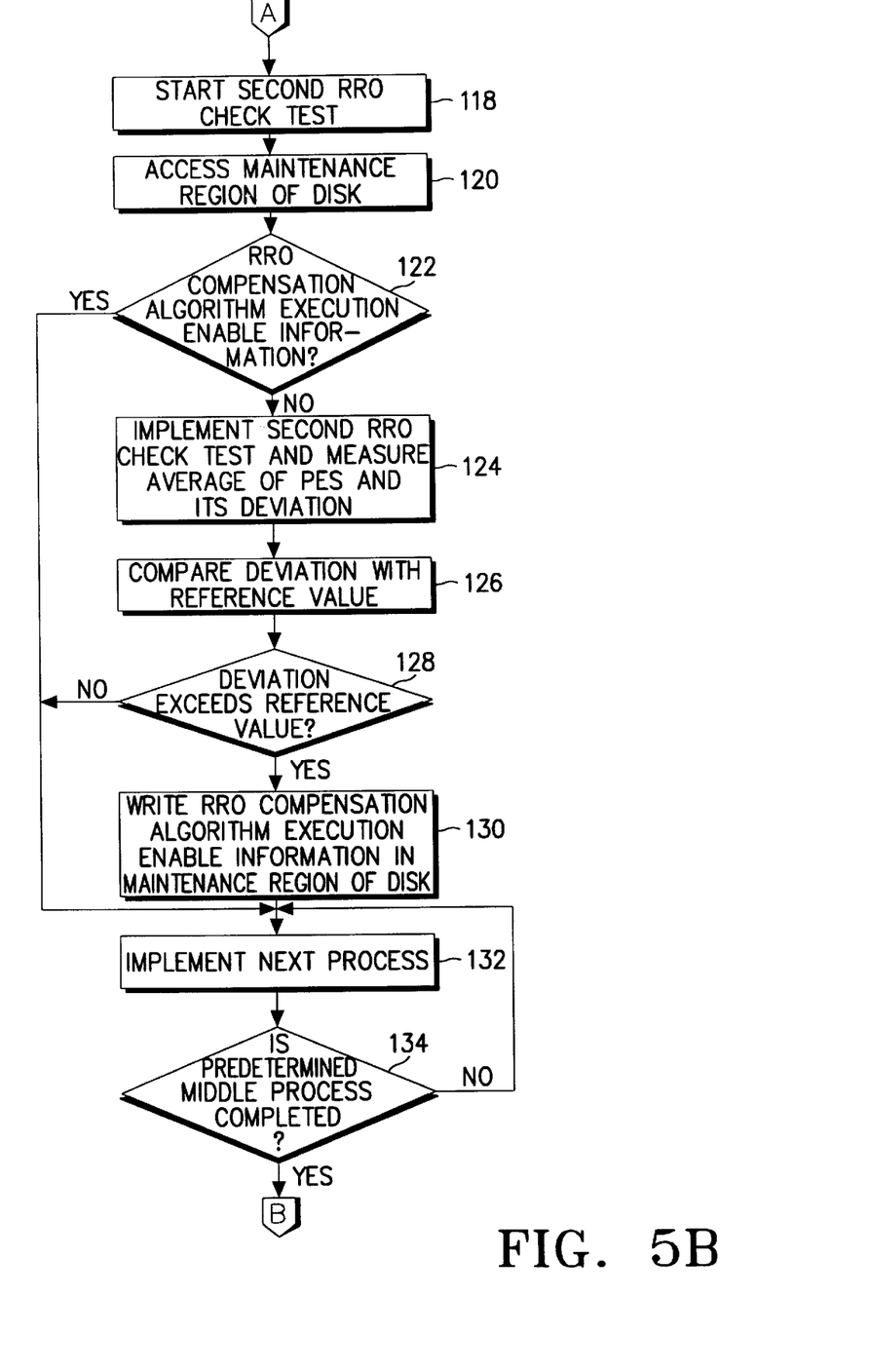
Figure 5C:
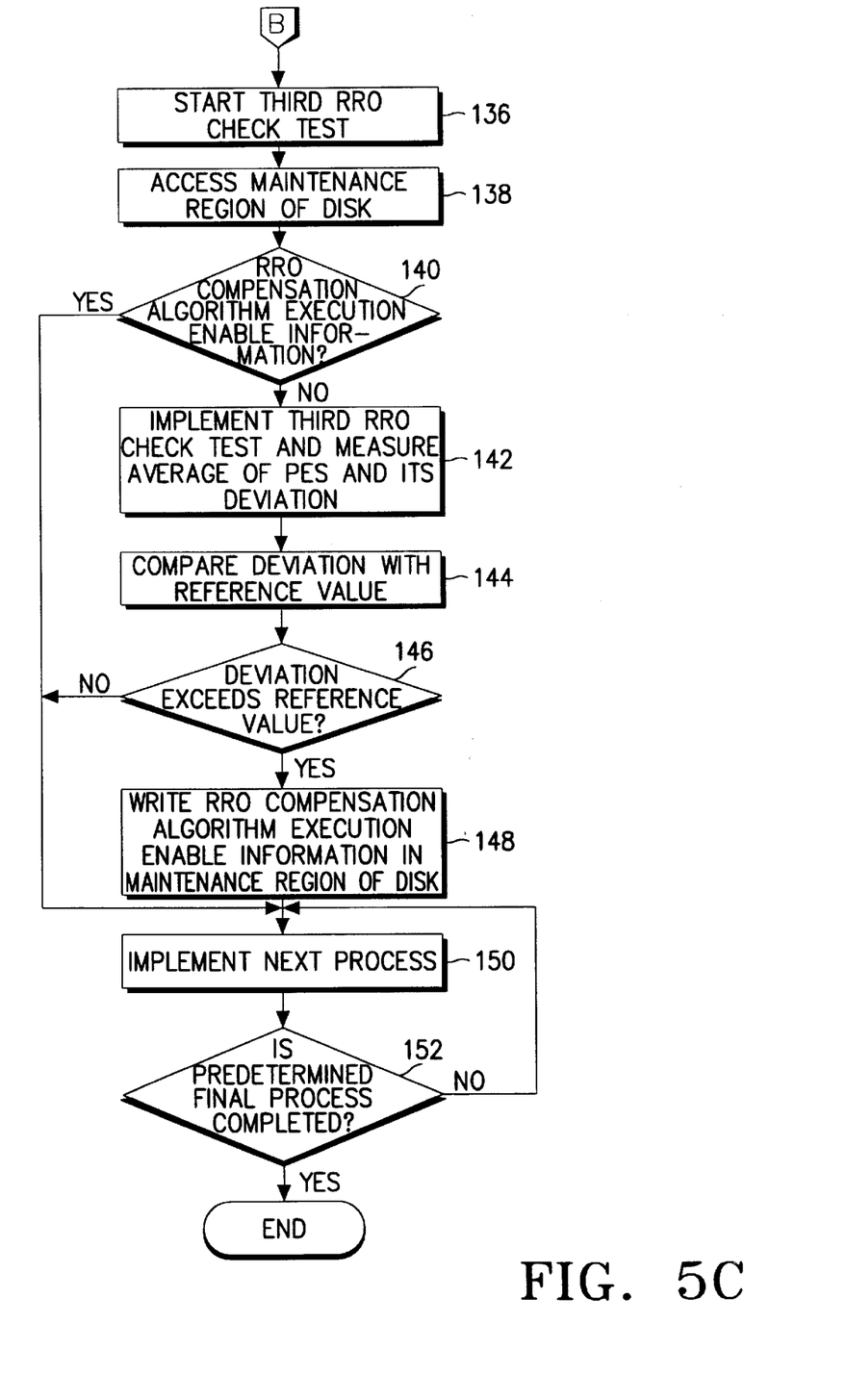

FIGS. 5A to 5C illustrate a check routine for determining whether to execute the RRO compensation algorithm under the burn-in test environment. Steps 100–116 shown in FIG. 5A, steps 118–134 in FIG. 5B and steps 136–152 in FIG. 5C are implemented in the initial, middle and final stages of the burn-in test process, respectively.

Referring now to FIGS. 3 and 5A, the microcontroller 40 checks, at step 100, whether a current process is a burn-in test process with reference to data of the maintenance region of the disk written in a process just before the burn-in test process. If the current process is a burn-in test process, a first RRO check test is started at step 102. The RRO compensation algorithm of a default state is disabled at step 104. At step 106, the first RRO check test is implemented at a specific track on the disk of the uppermost head, and an average of the PES and its standard deviation are measured. The uppermost head is a head which is farthest away from the base of the spindle motor 52, that is, a head corresponding to the upper surface of the uppermost disk among the disks in the multi-platter type HDD. Referring to FIG. 4, the uppermost head is the head 4A. The disk corresponding to the uppermost head 4A is disk 2A. During the first RRO check test, the uppermost head and the specific track on the disk corresponding to the uppermost head are determined as a test point for the following reasons. The disks of the multi-platter type HDD differ in eccentricity between the head and the track center line of the disk according to the stacked position of each disk. The disk near the base of the spindle motor 52 is smaller in eccentricity than the disk far away therefrom. Therefore, the disk which is furthest from the base of the spindle motor 52 has the largest eccentricity between the head corresponding to that disk and the track center line. Consequently, in the drive of the multi-platter type HDD, the RRO phenomenon appears in the uppermost head and the disk corresponding thereto. In the RRO check test of step 106, data of a constant pattern is written and read.

The second RRO check test process is shown in FIG. 5B. The microcontroller 40 starts the second RRO check test at step 118. At step 120, the maintenance region of the disk is accessed. It is determined, at step 122, whether there is RRO compensation algorithm enable information. If so, since there is no need to implement the second RRO check test, the process following the second RRO check test is performed at step 132. If there is no compensation algorithm enable information, steps 124–132 (which are the same as steps 106–114 shown in FIG. 5A) are sequentially executed. At step 134, a determination is made as to whether a predetermined middle process is completed with reference to the burn-in script (that is, the list made to perform the burn-in test process). If the middle process is completed, a third RRO check test is performed in the final stage of the burn-in test process.

The third RRO check test process is illustrated in FIG. 5C. Steps 136–150 shown in FIG. 5C are the same as steps 118–132 indicated in FIG. 5B, and will therefore not be described in detail.

At step 150, the process following the third RRO check test, (that is, a final burn-in test process) is performed. It is determined, at step 152, whether a predetermined final process is completed with reference to the burn-in script. If the final burn-in test process is completed, the check routine for determining whether to execute the RRO compensation algorithm under the burn-in test environment is ended.

Thus, information for determining whether to enable or disable the RRO compensation algorithm in a corresponding drive is written in the maintenance region of the disk by the check routines of FIGS. 5A to 5C.

Meanwhile, a check for determining whether to enable or disable the RRO compensation algorithm in a user's drive is also performed. This check routine is provided by a SMART (Self-Monitoring, Analysis, and Reporting Technology) function. Software for the SMART function exists in both the host computer and the HDD. Generally, during an idle time (while the user is not using the drive), the drive is activated to test the operation states of the spindle motor, the disk, the head, etc., and to transmit the test result to the host computer. The host computer monitors the test result so that the user can know the state of the drive. If it is determined that the drive may lose data written on the disk, the host computer informs the user that data of the disk should be backed up.

Figure 6:
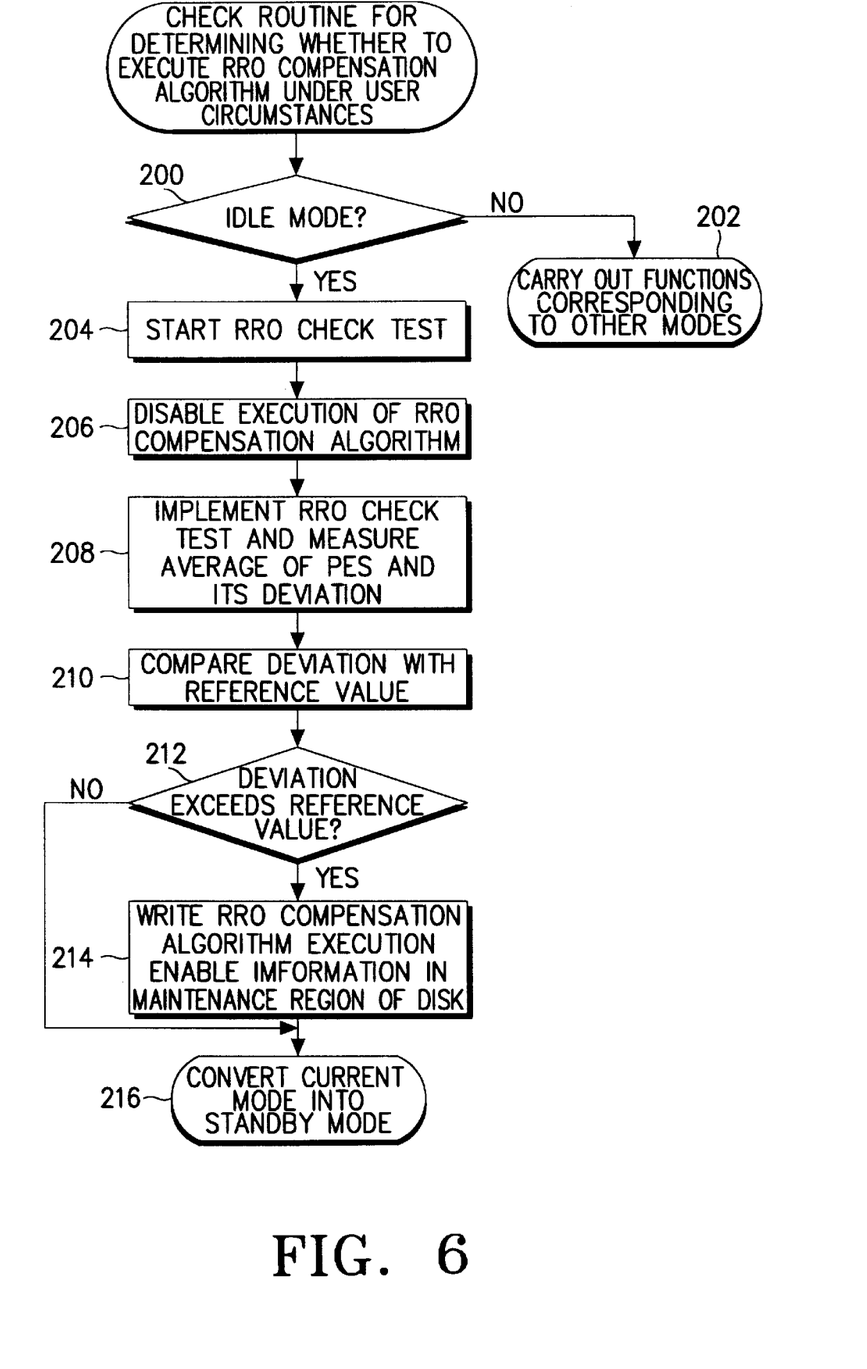
FIG. 6 is a flow chart showing a check routine of an RRO compensation algorithm under a user environment according to the present invention.

A check routine for the RRO compensation algorithm using the SMART function in the user environment is shown in FIG. 6. At step 200, the microcontroller 40 determines whether the current state is an idle mode. If not, functions corresponding to other modes are carried out at step 202. If the current state is the idle mode, an RRO check test is started at step 204. The RRO compensation algorithm is disabled at step 206. The RRO check test is performed at a specific track on the disk of the uppermost head, and the average of the PES and its standard deviation are measured at step 208. At step 210, the measured standard deviation is compared with a predetermined reference value. It is determined, at step 212, whether the standard deviation exceeds the reference value. If so, RRO compensation algorithm enable information is written in the maintenance region of the disk at step 214. The current mode is converted into a standby mode at step 216. If the standard deviation does not exceed the reference value, a currently used drive need not be provided with the RRO compensation algorithm information.

As noted above, the check routine for determining whether to enable or disable the RRO compensation algorithm is executed, and the checked result is written in the maintenance region of the disk. If there is no RRO phenomenon, the RRO compensation algorithm is disabled, if there is an RRO phenomenon, the RRO compensation algorithm is enabled.

Figure 7:
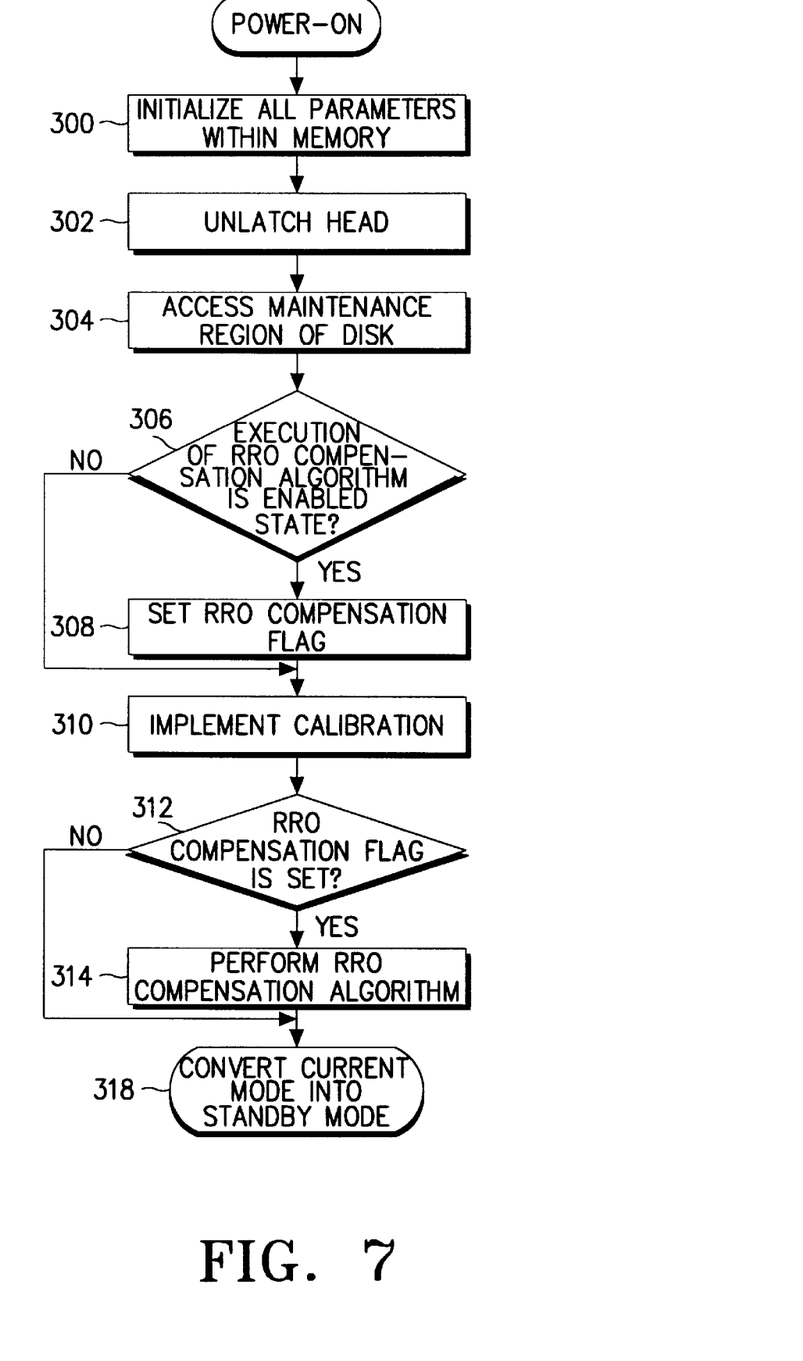
FIG. 7 is a flow chart showing a control routine for controlling an RRO compensation algorithm according to the present invention.

Referring to FIG. 7, a control flow diagram for controlling the RRO compensation algorithm is illustrated. The operation of FIG. 7 is carried out in the user environment. If the user turns on power, the microcontroller 40 initializes all parameters within the memory at step 300. The head is unlatched at step 302. The maintenance region of the disk is accessed at step 304. It is determined, at step 306, whether the RRO compensation algorithm is in an enable state. This check is possible since the RRO compensation algorithm enable/disable information is written in the maintenance region of the disk by the routines of FIGS. 5A–5C and 6. If the RRO compensation algorithm is in the enable state, an RRO compensation flag in the memory is set at step 308, and a calibration process is implemented at step 310. On the other hand, if the RRO compensation algorithm is not in the enable state, the process proceeds directly from step 306 to step 310 to implement the calibration process. It is determined, at step 312, whether the RRO compensation flag is set. If it is, the RRO compensation algorithm is performed at step 314, and the current mode is converted into a standby mode at step 318. If the RRO compensation flag is not set, the RRO phenomenon is not generated in a currently used drive, so that control transfers directly from step 312 to step 318.

Consequently, in performing the RRO compensation algorithm, a determination as to whether to enable or disable the RRO compensation algorithm is made. If there is no RRO phenomenon, the RRO compensation algorithm is disabled; if there is an RRO phenomenon, the RRO compensation algorithm is enabled to compensate for the RRO phenomenon. Therefore, the characteristic of the system is stabilized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling a repeatable runout (RRO) compensation algorithm in a hard in a hard drive, comprising the steps of:
   determining whether to enable or disable said RRO compensation algorithm in a corresponding drive in a test environment while said drive is being fabricated, and in a user environment by using a check routine for determining whether to execute said RRO compensation algorithm;
   writing a determined result in a disk of said hard disk drive; and
   selectively enabling or disabling said RRO compensation algorithm according to said determined result in the user environment.

2. The method as set forth in claim 1, wherein said test environment while said hard disk drive is being fabricated comprises a burn-in test process.

3. The method as set forth in claim 2, wherein said check routine for determining whether to execute said RRO compensation algorithm is carried out in initial, middle and final stages of said burn-in test process.

4. The method as set forth in claim 1, wherein said check routine for determining whether to execute said RRO compensation algorithm is carried out in initial, middle and final stages of said test environment.

5. The method as set forth in claim 1, wherein said check routine for determining whether to execute said RRO compensation algorithm is performed during an idle time of said hard disk drive in said user environment.

6. A method for controlling a repeatable runout (RRO) compensation algorithm in a hard disk drive, comprising the steps of:
   determine whether to enable or disable said RRO compensation algorithm in a burn-in test process of said hard disk drive by using a check routine for determining whether to execute said RRO compensation algorithm;
   writing a determined result onto a disk of said hard disk drive; and
   selectively enabling or disabling said RRO compensation algorithm according to said determined result when a user utilizes said hard disk drive.

7. The method as set forth in claim 6, wherein said check routine for determining whether to execute said RRO compensation algorithm comprises the steps of:
   detecting an error position signal by repeatedly writing and reading test data on a specific track on a disk corresponding to an uppermost head which is furthest away from a spindle motor;
   measuring an average of said position error signal and its standard deviation;
   comparing said standard deviation with a reference value to obtain a comparison result; and
   writing RRO compensation algorithm enable/disable information onto a maintenance region of said disk according to said comparison result.

8. The method as set forth in claim 7, wherein said check routine for determining whether to execute said RRO compensation algorithm is carried out in initial, middle and final stages of said burn-in test process.

9. The method as set forth in claim 6, wherein said check routine for determining whether to execute said RRO compensation algorithm is carried out in initial, middle and final stages of said burn-in test process.

10. A method for controlling a repeatable runout (RRO) compensation algorithm in a hard disk drive, comprising the steps of:
    determining whether to enable or disable said RRO compensation algorithm by using a check routine for determining whether to execute said RRO compensation algorithm;
    writing a determined result onto a disk of said hard disk drive; and
    selectively enabling or disabling said RRO compensation algorithm according to said determined result.

11. The method as set forth in claim 10, wherein said using of said check routine for determining whether to execute said RRO compensation algorithm comprises the steps of:

detecting a position error signal by repeatedly writing and reading test data on a specific track on a disk corresponding to an uppermost head which is furthest away from a spindle motor;

measuring an average of said position error signal and its standard deviation;

comparing said standard deviation with a reference value to obtain a comparison result; and writing RRO compensation algorithm enable/disable information onto a maintenance region of said disk according to said comparison result.

12. The method as set forth in claim 10, wherein the determining step is carried out during an idle time of a user environment of said hard disk drive.

13. The method as set forth in claim 10, wherein the determining step is carried out under burn-in test circumstances.

14. The method as set forth in claim 11, wherein RRO compensation algorithm enable information is written onto the maintenance region of said disk when the standard deviation exceeds the reference value.

15. The method as set forth in claim 11, further comprising converting a current mode into a standby mode when the standard deviation does not exceed the reference value.

16. A method for determining whether to execute a repeatable runout (RRO) compensation algorithm under burn-in test circumstances, comprising the steps of:

determining whether there is a burn-in test process occurring;

when there is a burn-in test process occurring, commencing a first RRO check test;

measuring an average of a position error signal (PES) and a deviation thereof;

comparing said deviation to a reference value; and when said deviation exceeds said reference value, writing RRO compensation algorithm execution enable information onto a maintenance region of a disk.

17. The method as set forth in claim 16, wherein said step of commencing said first RRO check test comprises the steps of:

disabling execution of said RRO compensation algorithm; and carrying out said first RRO check test.

18. The method as set forth in claim 16, further comprising the step of:

when said deviation does not exceed said reference value, carrying out a next process, and then determining whether a predetermined initial process has been completed.

19. The method as set forth in claim 18, further comprising the step of:

when said initial process is completed, commencing a second RRO check test.

20. The method as set forth in claim 19, wherein said second RRO check test comprises the steps of:

accessing a maintenance region of said disk;

determining whether RRO compensation algorithm execution enable information is present; and when said RRO compensation algorithm execution enable information is present, carrying out a further process.

21. The method as set forth in claim 20, further comprising the steps of:

determining whether a predetermined middle process is completed;

when said predetermined middle process is completed, commencing a third RRO check test.

22. The method as set forth in claim 21, wherein said step of commencing said third RRO check test comprises the steps of:

accessing a maintenance region of said disk;

determining whether RRO compensation algorithm execution enable information is present; and when said RRO compensation algorithm execution enable information is present, carrying out a still further process.

23. The method as set forth in claim 22, further comprising the steps of:

determining whether a predetermined final process is completed; and when said predetermined final process is completed, ending the method.

24. The method as set forth in claim 20, further comprising the steps of:

when said RRO compensation algorithm execution enable information is not present, carrying out a second RRO check test;

measuring an average of said PES and said deviation thereof;

comparing said deviation with a reference value;

when said deviation exceeds said reference value, writing RRO compensation algorithm execution enable information in said maintenance region of said disk.

25. The method as set forth in claim 22, further comprising the steps of:

when said RRO compensation algorithm execution enable information is not present, carrying out a third RRO check test;

measuring an average of said PES and said deviation thereof;

comparing said deviation with a reference value; and when said deviation exceeds said reference value, writing RRO compensation algorithm execution enable information onto said maintenance region of said disk.

26. A method of controlling a repeatable runout (RRO) compensation algorithm, comprising the steps of:

initializing all parameters within a memory associated with a hard disk drive;

unlatching a head of said hard disk drive;

accessing a maintenance region of a disk of said hard disk drive;

determining whether execution of said RRO compensation algorithm is enabled; and when execution of said RRO compensation algorithm is enabled, setting an RRO compensation flag.

27. The method as set forth in claim 26, further comprising the steps of:

implementing a calibration process;

determining whether an RRO compensation flag is set; and when said RRO compensation flag is set, performing said RRO compensation algorithm.

28. The method as set forth in claim 27, further comprising the step of converting a current mode of said hard disk drive into a stand-by mode thereof when said RRO compensation algorithm has been performed.

29. The method as set forth in claim 26, further comprising the step of:
   when said execution of said RRO compensation algorithm is not enabled, carrying out a calibration process.

30. The method as set forth in claim 29, further comprising the steps of:
   after said calibration process is carried out, determining whether said RRO compensation flag is set; and
   when said RRO compensation flag is set, performing said RRO compensation algorithm.

31. The method as set forth in claim 30, further comprising the steps of:
   when said RRO compensation flag is not set, converting a current mode of said hard disk.

32. The method as set forth in claim 26, wherein said RRO compensation algorithm is controlled in a user environment.

33. The method as set forth in claim 26, wherein said RRO compensation algorithm is controlled under burn-in test circumstances.

* * * * *